United States Patent
Cavil

(10) Patent No.: US 10,519,951 B2
(45) Date of Patent: Dec. 31, 2019

(54) VANE PUMP SEAL

(71) Applicant: Hamilton Sundstrand Corporation, Windsor Locks, CT (US)

(72) Inventor: Luke Cavil, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 44 days.

(21) Appl. No.: 15/397,397

(22) Filed: Jan. 3, 2017

(65) Prior Publication Data
US 2018/0187677 A1    Jul. 5, 2018

(51) Int. Cl.
| | | |
|---|---|---|
| F16L 25/00 | (2006.01) | |
| F16L 23/12 | (2006.01) | |
| F04C 27/00 | (2006.01) | |
| F01C 19/00 | (2006.01) | |
| F16J 15/02 | (2006.01) | |
| F04C 15/00 | (2006.01) | |
| F04D 13/12 | (2006.01) | |
| F04D 29/10 | (2006.01) | |
| F04C 2/34 | (2006.01) | |
| F04C 11/00 | (2006.01) | |

(52) U.S. Cl.
CPC ............ *F04C 15/0023* (2013.01); *F04C 2/34* (2013.01); *F04C 11/001* (2013.01); *F04D 13/12* (2013.01); *F04D 29/106* (2013.01); *F16J 15/02* (2013.01); *F04C 2240/30* (2013.01)

(58) Field of Classification Search
CPC ...... F01C 19/005; F01C 19/10; F04C 27/007; F04C 27/001; F04C 15/0023; F16J 15/3412; F16J 15/3424; F16J 15/02; F04D 29/106

USPC ................. 418/140, 136, 139; 277/614, 615
See application file for complete search history.

(56) References Cited

U.S. PATENT DOCUMENTS

| | | | |
|---|---|---|---|
| 2,281,650 A | 5/1942 | Wislicenus | |
| 2,688,520 A * | 9/1954 | Covington | F16C 33/78 |
| | | | 109/63.5 |
| 3,247,797 A | 4/1966 | Sieghartner | |
| 6,394,462 B1 * | 5/2002 | Constantinides | F16D 65/18 |
| | | | 188/153 D |
| 8,226,089 B2 * | 7/2012 | Pallini, Jr. | E21B 17/04 |
| | | | 277/607 |

(Continued)

FOREIGN PATENT DOCUMENTS

| | | |
|---|---|---|
| CA | 2126262 A1 | 12/1995 |
| DE | 102005039612 A1 | 2/2006 |

(Continued)

OTHER PUBLICATIONS

Search Report dated May. 11, 2018 in U310865EP, EP No. 17199830, 8 pages.

*Primary Examiner* — Deming Wan
(74) *Attorney, Agent, or Firm* — Cantor Colburn LLP

(57) ABSTRACT

A seal tube assembly of a pump system is provided. The seal tube assembly includes a single seal tube having a first axial end sealably coupled to a first vane pump and a second axial end sealably coupled to a second vane pump. The single seal tube includes transverse contact surfaces at the first axial end and transverse contact surfaces at the second axial end. The single seal tube is formed to define a first seal tube cavity at the first axial end and a second seal tube cavity at the second axial end.

3 Claims, 4 Drawing Sheets

(56) References Cited

U.S. PATENT DOCUMENTS

2014/0271141 A1    9/2014  Landry
2014/0334953 A1*  11/2014  Parmeter ............... F04D 29/047
                                                      417/423.3

FOREIGN PATENT DOCUMENTS

DE    102011014591B4 A   9/2012
EP         2110558 A1   10/2009
WO       2013011105 A2   1/2013

* cited by examiner

VANE PUMP SEAL

STATEMENT OF FEDERAL SUPPORT

This invention was made with Government support under contract number D6305-L09C-52-00-2100000 awarded by United States Air Force. The Government has certain rights in the invention.

BACKGROUND

The following description relates to a vane pump seal and, more particularly, to a vane pump seal with a single seal tube that incorporated an internal O-ring and has backup rings on each end.

In a pump system of an engine or transmission of an aircraft, for example, first and second vane pump elements are provided for operation about a rotor. Each vane pump typically has two labyrinth seals that seal the spinning rotor to limit leakage from a high pressure region surrounding the rotor outer diameter to a low pressure region surrounding the rotor inner diameter. The labyrinth seals provide for a very tight clearance between stationary seals and the spinning rotor and this tight clearance limits the potential for leakage to occur.

The tight clearance can lead to issues, however, arising from thermal growth, misalignment or axial movement of the components noted above or from the occurrence of small contamination particles passing through fuel filters and causing various parts to touch and which can result in galling. These and other issues can lead to seizure of either of both of the labyrinth seals and a seized labyrinth seal can be a source of significant leakage as well as a loss of pump efficiency.

BRIEF DESCRIPTION

According to one aspect of the disclosure, a seal tube assembly of a pump system is provided. The seal tube assembly includes a single seal tube having a first axial end sealably coupled to a first vane pump and a second axial end sealably coupled to a second vane pump. The single seal tube includes transverse contact surfaces at the first axial end and transverse contact surfaces at the second axial end. The single seal tube is formed to define a first seal tube cavity at the first axial end and a second seal tube cavity at the second axial end.

In accordance with additional or alternative embodiments, sets of o-rings and back-up rings are receivable in the first and second seal tube cavities.

In accordance with additional or alternative embodiments, the single seal tube includes leaded bronze.

In accordance with another aspect of the disclosure, a pump system is provided. The pump system includes first and second vane pumps that are each rotatably disposed for respective operations about first and second axial lengths of a rotor. The first vane pump includes a first body and a first flange extending from the first body. The second vane pump includes a second body and a second flange extending from the second body. The first body, the first flange, the second body and the second flange cooperatively define a first cavity and cooperatively define a second cavity located between the first cavity and the rotor. The pump system further includes a seal tube assembly which is sealably coupled to the first and second flanges to inhibit fluid flow between the first and second cavities.

In accordance with additional or alternative embodiments, the first and second bodies are annularly disposed about the rotor, the first and second flanges are annularly disposed about the rotor and the first and second cavities are annularly defined about the rotor.

In accordance with additional or alternative embodiments, the seal tube assembly includes a single seal tube having a first axial end sealably coupled to the first flange and a second axial end sealably coupled to the second flange and opposite the first axial end.

In accordance with additional or alternative embodiments, the single seal tube includes transverse, flange contacting surfaces at the first axial end and transverse, flange contacting surfaces at the second axial end.

In accordance with additional or alternative embodiments, the single seal tube is formed to define a first seal tube cavity at the first axial end and a second seal tube cavity at the second axial end and the seal tube assembly further includes sets of o-rings and back-up rings receivable in the first and second seal tube cavities.

In accordance with additional or alternative embodiments, the single seal tube includes leaded bronze.

In accordance with additional or alternative embodiments, the first body includes a first radial surface extending a first radial length from a position proximate to the first flange and a first additional flange extending axially from a distal end of the first radial surface and the second body includes a second radial surface extending a second radial length from a position proximate to the second flange and a second additional flange extending axially from a distal end of the second radial surface.

In accordance with additional or alternative embodiments, the second radial length is shorter than the first radial length.

In accordance with additional or alternative embodiments, the second additional flange is disposed between the first additional flange and the rotor.

According to yet another aspect of the disclosure, a method of retro-fitting a pump system is provided. The pump system includes vane pumps rotatably disposed for respective operations about axial lengths of a rotor. The vane pumps each include a body and a flange that extends from the corresponding body and each of the bodies and the flanges cooperatively define a first cavity and a second cavity between the first cavity and the rotor. The method of retro-fitting the pump system includes removing labyrinth seal assemblies from the first and second cavities and sealably coupling a seal tube assembly to the flanges whereby the seal tube assembly is provided to inhibit fluid flow between the first and second cavities.

In accordance with additional or alternative embodiments, the removing of the labyrinth seal assemblies includes unfastening labyrinth seal fasteners for respective labyrinth seals from each of the bodies and removing the labyrinth seal fasteners, the respective labyrinth seals and labyrinth seal support elements from the first and second cavities.

In accordance with additional or alternative embodiments, the sealably coupling of the seal tube assembly includes sealably coupling an axial end of a single seal tube to one of the flanges and sealably coupling another axial end of the single seal tube to the other one of the flanges.

In accordance with additional or alternative embodiments, the sealably coupling of the seal tube assembly further includes forming a pair of contact surfaces between the one of the flanges and transverse, flange contacting surfaces at the corresponding axial end of the single seal tube and forming a pair of contact surfaces between the other one of the flanges and transverse, flange contacting surfaces at the corresponding axial end of the single seal tube.

In accordance with additional or alternative embodiments, the method further includes defining seal tube cavities at the axial ends of the single seal tube and inserting sets of o-rings and back-up rings in the seal tube cavities.

In accordance with additional or alternative embodiments, the single seal tube includes leaded bronze.

In accordance with additional or alternative embodiments, the method further includes redistributing structural features of the vane pumps at a region defined radially outwardly from the seal tube assembly.

In accordance with additional or alternative embodiments, the method further includes forming additional fuel compartments from the redistribution of the structural features of the vane pumps.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As will be described below, the two adjacent labyrinth seals described above and their retaining hardware are eliminated from a pump system. A single seal tube is then added to seal first and second vane pumps together. The single seal tube incorporates an internal o-ring and a back-up ring on each end thereof to seal the tube to the vane pumps. During normal operations, the single seal tube rotates at the same velocity as both of the vane pumps and the o-rings completely seal adjacent areas from leakage that previously existed so that axial pressure balance of the rotor is unaffected. The single seal tube and the o-rings can have a design life that meets or exceeds the full service life of the pump system. The quantity of leakage eliminated can then be used to improve pump efficiency or can be applied to provide for additional leakage allowance to remaining labyrinth seals by allowing for an increase in their diametrical clearances and by improving their robustness to failure. During emergency operations, where one pump is seized (stationary) and the other is still spinning, a mission abort or the declaration of an in-flight emergency at a pilot's discretion can ensure with the aircraft being immediately landed. Here, while relative motion of the pumps can cause the o-rings to wear out and provide a leak path, flight times during emergency operations are limited and the usefulness of the single seal tube and the o-rings remains apparent.

Figure 1:
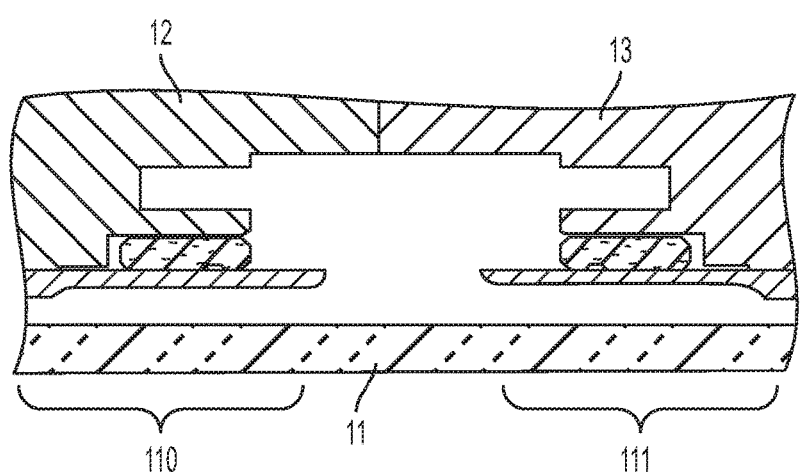
FIG. 1 is a side view of a pump system at one side of a rotor in accordance with embodiments.
Figure 2:
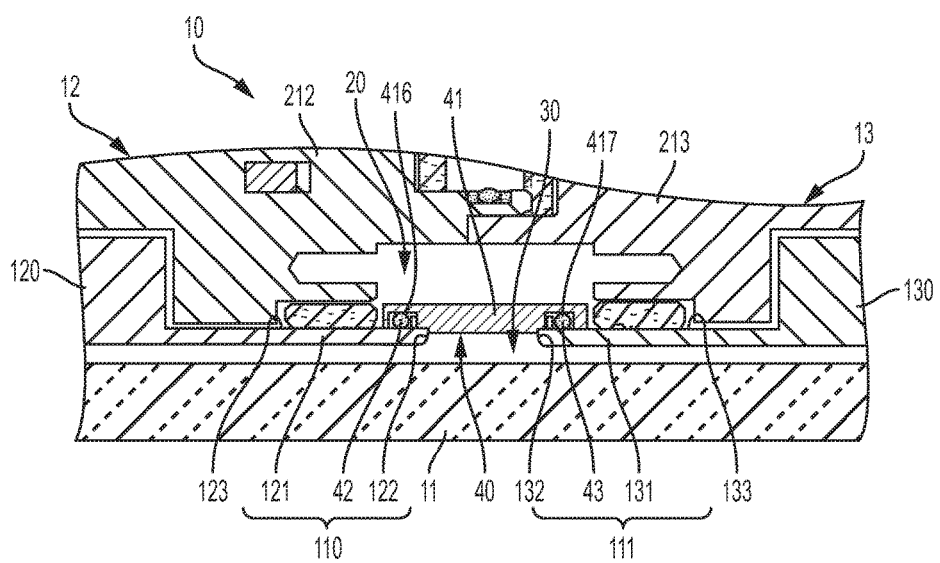
FIG. 2 is a side view of the pump system of FIG. 1 with a seal tube assembly in accordance with embodiments.

With reference to FIGS. 1 and 2, a pump system 10 (see FIG. 2) is provided. The pump system 10 includes a rotor 11, a first vane pump 12 and a second vane pump 13. The rotor 11 extends along a longitudinal axis and has a first axial length 110 associated with the first vane pump 12 and a second axial length 111 associated with the second vane pump 13. The rotor 11 is rotatable about a longitudinal axis thereof. The first vane pump 12 is rotatably disposed about the rotor 11 and configured to provide for first fluid pumping action about the first axial length 110 of the rotor 11. The second vane pump 13 is rotatably disposed about the rotor 11 and configured to provide for second fluid pumping action about the second axial length 111 of the rotor 11.

As shown in FIGS. 1 and 2, the first vane pump 12 includes a first body 120, which is annularly disposed for rotation about the rotor 11, and a first flange 121. The first flange 121 extends in a first axial direction from a portion of the first body 120 that is radially proximate to the rotor 11. Thus, the first flange 121 extends along the first axial direction at a radial location that is proximate to the rotor 11. Similarly, the second vane pump 13 includes a second body 130, which is annularly disposed for rotation about the rotor 11, and a second flange 131. The second flange 131 extends in a second axial direction, which is opposite the first axial direction, from a portion of the second body 130 that faces the portion of the first body 120 and is radially proximate to the rotor 11. Thus, the second flange 131 extends along the second axial direction at a radial location that is proximate to the rotor 11.

The first flange 121 includes an axial face 122 that faces in the first axial direction and a radial face 123 that faces radially outwardly. The second flange 131 includes an axial face 132 that faces in the second axial direction and a radial face 133 that faces radially outwardly. The radial location of the first flange 121 and the radial location of the second flange 131 may be substantially similar. As such, the axial faces 122 and 132 generally oppose one another and the radial faces 123 and 133 may be substantially co-planar.

When the first vane pump 12 and the second vane pump 13 are provided about the rotor 11, the first and second bodies 212 and 213 and the first and second flanges 121 and 131 cooperatively define a first cavity 20 and a second cavity 30. The first cavity 20 is generally defined at radial locations outside the radial faces 123 and 133 and is annularly defined about the rotor 11. A location of the second cavity 30 is generally defined between the first cavity 20 and the rotor 11 and in the region between the axial faces 122 and 132. The second cavity 30 is annularly defined about the rotor 11.

Figure 3:
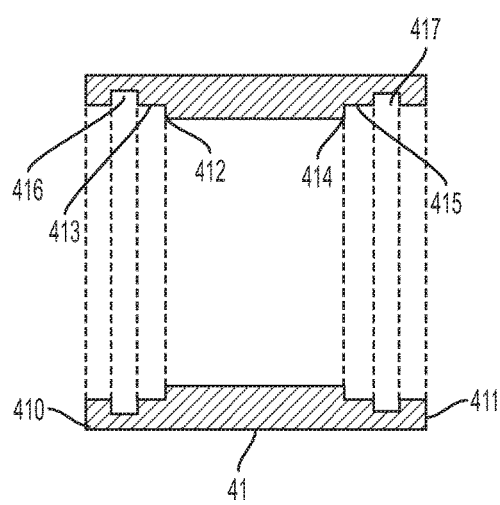
FIG. 3 is a cross-sectional side view of a single seal tube of the seal tube assembly of FIG. 2.
Figure 4:
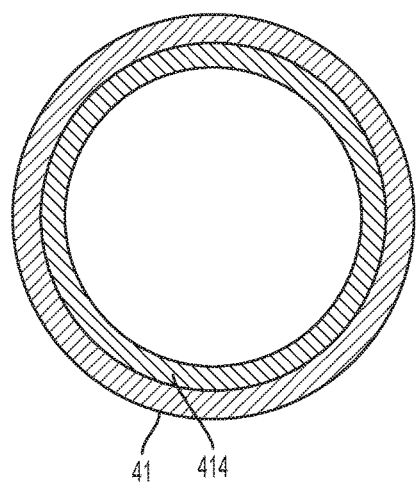
FIG. 4 is an axial view of the single seal tube of FIG. 3.

With continued reference to FIG. 2 and with additional reference to FIGS. 3 and 4, the pump system 10 further includes a seal tube assembly 40. The seal tube assembly 40 is sealably coupled or, in some cases, secured to the first and second flanges 121 and 131 and is configured to inhibit fluid flow between at least the first cavity 20 and the second cavity 30. More particularly, the seal tube assembly 40 is radially sealably coupled or secured about the first and second flanges 121 and 131 and axially sealably coupled or secured between the portions of the first and second flanges 121 and 131. The seal tube assembly 40 includes a single seal tube 41, a first o-ring and back-up ring set 42 and a second o-ring and back-up ring set 43. The single seal tube 41 has a first axial end 410 that is radially and axially sealably coupled or secured to the first flange 121 and a second axial end 411 that is radially and axially sealably coupled or secured to the second flange 131. The first and second axial ends 410 and 411 are opposite one another.

The single seal tube 41 is formed of leaded bronze or other similar materials. As shown in FIGS. 3 and 4, the single seal tube 41 includes first and second transverse, flange contacting surfaces 412 and 413 at the first axial end 410 as well as first and second transverse, flange contact surfaces 414 and 415 at the second axial end 411. When the single seal tube 41 is installed on the first and second vane pumps 12 and 13, the first and second transverse, flange contacting surfaces 412 and 413 at the first axial end 410 abut against the axial face 122 and the radial face 123 of the first flange 121, respectively, and the first and second transverse, flange contacting surfaces 414 and 415 abut against the axial face 132 and the radial face 133 of the second flange 131, respectively. In so doing, contact surfaces are formed between the single seal tube 41 and the first and second flanges 121 and 131 that sealably couple or securely retain the single seal tube 41 in both axial and radial dimensions.

The single seal tube 41 is also formed to define a first seal tube cavity 416 at the first axial end 410 thereof and a second seal tube cavity 417 at the second axial end 411 thereof. The first o-ring and back-up ring set 42 includes a first o-ring and a first back-up ring. Both the first o-ring and the first back-up ring are receivable in and contained within the first seal tube cavity 416 and serve to inhibit fluid flow between the first flange 121 and the single seal tube 41. The second o-ring and back-up ring set 43 includes a second o-ring and a second back-up ring. Both the second o-ring and the second back-up ring are receivable in and contained within the second seal tube cavity 417 and serve to inhibit fluid flow between the second flange 131 and the single seal tube 41.

Figure 5:
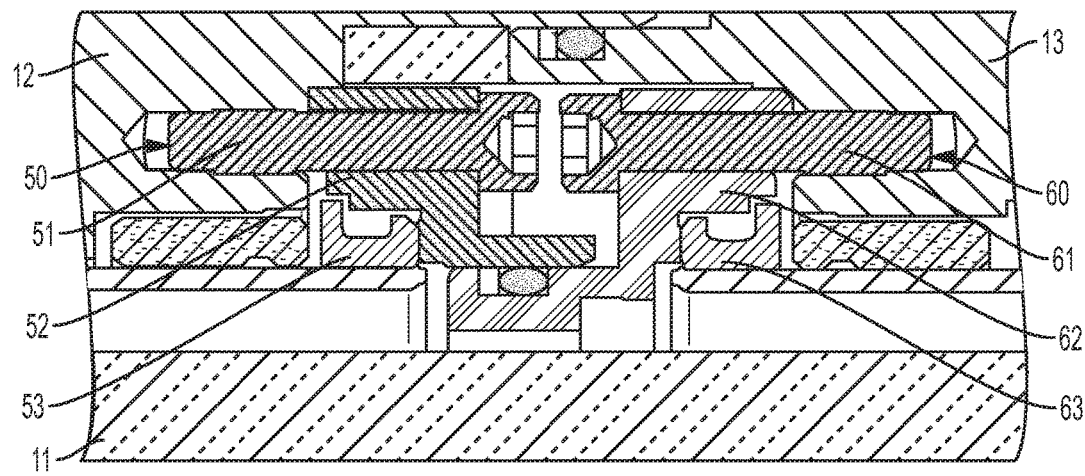
FIG. 5 is a side view of a portion of a pump system at one side of a rotor with labyrinth seals.
Figure 6:
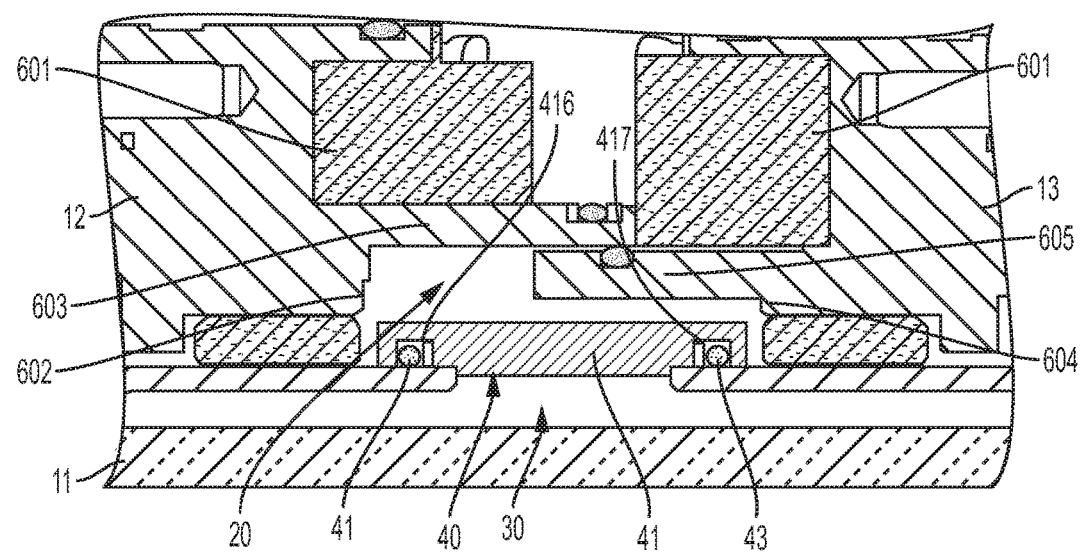
FIG. 6 is a side view of a portion of a pump system at one side of a rotor with redistributed structural features.

With reference back to FIG. 2 and additional reference to FIGS. 5 and 6, a method of retro-fitting a pump system (e.g., the pump system 10) is provided. As explained above, the pump system includes first and second vane pumps 12 and 13 that are rotatably disposed for respective operations about first and second axial lengths 110 and 111 of a rotor 11. The first vane pump 12 includes a first body 212 and a first flange 121 and the second vane pump 13 includes a second body 213 and a second flange 131. The first and second bodies 212 and 213 and the first and second flanges 121 and 131 cooperatively define first and second cavities 20 and 30. The method of retro-fitting the pump system includes an initial operation of removing first and second labyrinth seal assemblies 50 and 60 from the first and second cavities 20 and 30. Once the first and second labyrinth seal assemblies 50 and 60 are removed, the method further includes sealably coupling or, in some cases, securing the first and second axial ends 410 and 411 of the seal tube assembly 40 to the first and second flanges 121 and 131, respectively, whereby the seal tube assembly 40 as described above is provided to inhibit fluid flow between the first and second cavities 20 and 30.

As shown in FIG. 5 and, in accordance with embodiments, the removing of the first and second labyrinth seal assemblies 50 and 60 includes unfastening first and second labyrinth seal fasteners 51 and 61 for respective first and second labyrinth seal support elements 52 and 62 from each of the first and second bodies 212 and 213. Subsequently, the method includes removing the first and second labyrinth seal fasteners 51 and 61, the respective first and second labyrinth seals 53 and 63 and first and second labyrinth seal support elements 52 and 62 from the first and second cavities 20 and 30.

As shown in FIG. 6, the method may further include a re-distribution of various structural features of the first and second vane pumps 12 and 13 at a region defined radially outwardly from the seal tube assembly 40 and, in some cases, formation of additional fuel compartments 601 from the space provided as a result of the re-distribution of the various structural features of the first and second vane pumps 12 and 13. In an exemplary case, the re-distribution may result in the first body 212 being reconfigured to include a first radial surface 602 that extends a first radial length from a position proximate to the first flange 121 and a first additional flange 603 that extends axially from a distal end of the first radial surface 602.

Meanwhile, the re-distribution may result in the second body 213 being reconfigured to include a second radial surface 604 that extends a second radial length (which is shorter than the first radial length) from a position proximate to the second flange 131 and a second additional flange 605 that extends axially from a distal end of the second radial surface 604 and is disposed between the first additional flange 603 and the rotor 11. That is, the re-distribution may result in a size of the first cavity 20 being dramatically reduced and in the provision of additional space at radial locations defined outside the first additional flange 603 which were previously metal structure, replaced by fuel compartments 601 for the benefit of weight reduction.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A pump system, comprising:
    a first vane pump and a second vane pump;
    a single seal tube having an inner diameter portion with first and second ends and the inner diameter portion extending between the first and second ends, a first axial end sealably coupled to the first vane pump and a second axial end sealably coupled to the second vane pump,
    the single seal tube comprising:
        an axially forward facing contact surface adjacent to the first end of the inner diameter portion at the first axial end and a radially inward facing contact surface recessed radially outwardly from the inner diameter and oriented transversely with respect to the axially forward facing contact surface at the first axial end; and
        an axially rearward facing contact surface adjacent to the second end of the inner diameter portion at the second axial end and a radially inwardly facing contact surface recessed radially outwardly from the inner diameter and oriented transversely with respect to the axially rearward facing contact surface at the second axial end, and each of the radially inwardly facing contact surfaces at the first and second axial ends being formed with a respective radially outwardly extending recess to define first and second seal tube cavities at the first and second axial ends, respectively.

2. The pump system according to claim 1, further comprising sets of o-rings and back-up rings receivable in the first and second seal tube cavities.

3. The pump system according to claim 1, wherein the single seal tube comprises leaded bronze.

\* \* \* \* \*